United States Patent [19]
Ehrlich

[11] 3,788,049
[45] Jan. 29, 1974

[54] WHEEL MOUNTING ASSEMBLY FOR LAWN AND GARDEN TYPE TOOLS AND THE LIKE

[75] Inventor: Stephen Jeffrey Ehrlich, Randallstown, Md.

[73] Assignee: The Black and Decker Manufacturing Company, Towson, Md.

[22] Filed: Jan. 2, 1973

[21] Appl. No.: 320,487

[52] U.S. Cl................................ 56/16.9, 280/47.17
[51] Int. Cl............................................ A01d 55/18
[58] Field of Search...... 56/16.7, 16.9, 255; 172/13, 172/14; 280/47.17, 47.24

[56] References Cited
UNITED STATES PATENTS

| | | | |
|---|---|---|---|
| 2,930,176 | 3/1960 | Lindell | 56/16.9 |
| 3,350,864 | 11/1967 | Sheps et al | 56/16.9 |
| 3,625,292 | 12/1971 | Lay | 172/13 |

*Primary Examiner*—Antonio F. Guida

[57] ABSTRACT

A trimmer edger including a motor and cutter head suspended from an elongated upstanding control handle. A one-piece bracket is releasably clamped to the handle and secures an axle on which a pair of ground engaging wheels are journaled. The bracket is constructed to securely clamp the handle to the wheel axle and locates the wheels and handle with respect to each other and to the motor and cutter head for optimum balance and control.

10 Claims, 7 Drawing Figures

PATENTED JAN 29 1974 3,788,049
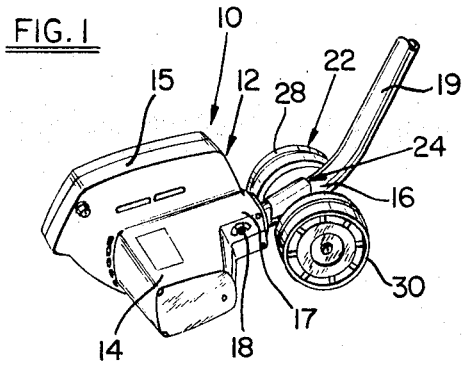
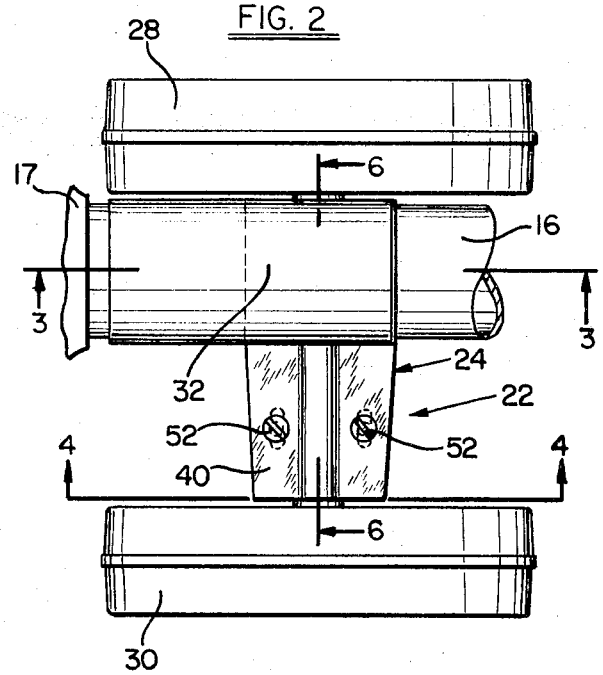
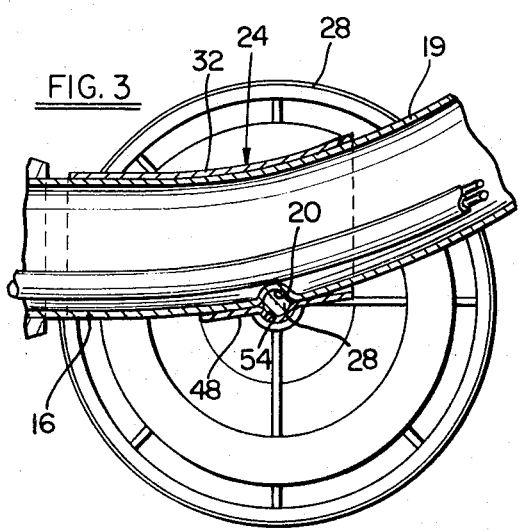
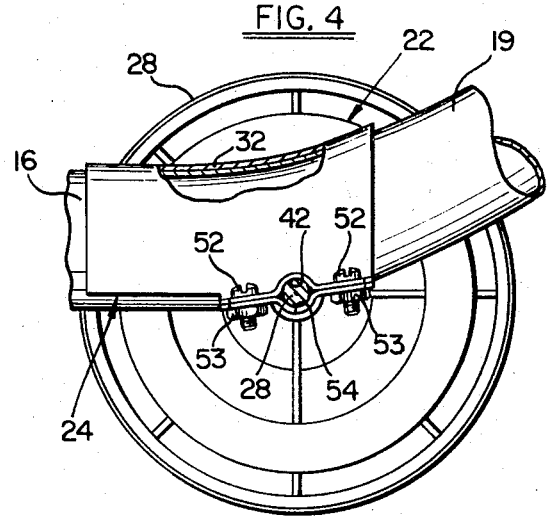
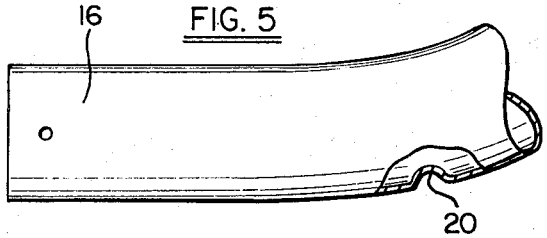
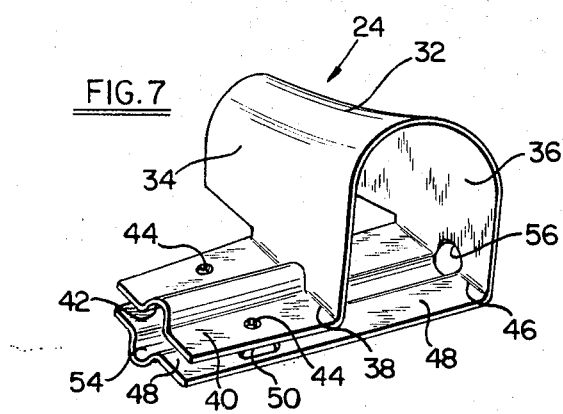
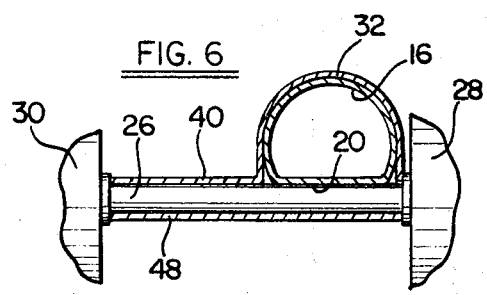

WHEEL MOUNTING ASSEMBLY FOR LAWN AND GARDEN TYPE TOOLS AND THE LIKE

BACKGROUND OF THE INVENTION

Field of The Invention

This invention relates generally to operator-steered and propelled tools and devices such as, for example, trimmer-edgers, and particularly to the wheel mounting and securing means for devices of this type.

Devices of the type referred to, for example, powered trimmer-edgers, generally are supported for movement over the ground by a two-wheel assembly. When the tool is new, these assemblies are generally satisfactorily operated; however, through use-wear and accumulation of debris, tire wear, etc., they continue to present a maintenance factor. Additionally, because of heavy use, such as lawn trimming and edging, for example, the wheels and mounting means if not sufficiently stable, do not afford the operator the degree of accuracy and control that is desired to use the tool in comfort and safety. Still further, it is desirable to produce the tool and its components at minimum expense and affording optimum maintenance characteristics.

SUMMARY OF THE INVENTION

An improved wheel mounting bracket assembly affording all of the characteristics mentioned above in which the bracket provides unusual strength, stability for the wheel assembly, and is inexpensively constructed; is readily removed and replaced by relatively inexperienced personnel; and in which the bracket includes, in conjunction with a rod-like or tubular handle, reinforced clamping and mounting plates which gripingly engage a wheel axle disposed transversely of a grooved handle and upon which wheels are readily mounted.

BRIEF DESCRIPTION OF THE DRAWING

FIG. 1 is a perspective view of a powered trimmer-edger, shown in the edging position, incorporating the invention, with an upper portion of the handle removed;

FIG. 2 is an enlarged, fragmentary top plan view of the vehicular assembly of the tool of FIG. 1;

FIG. 3 is a vertical section taken on the plane of line 3—3 of FIG. 2;

FIG. 4 is a vertical section taken on the plane of line 4—4 of FIG. 2, with a portion of the mounting sleeve of the bracket broken away;

FIG. 5 is a side elevational view of the handle of the tool broken away, showing the portion received in the mounting bracket;

FIG. 6 is a vertical section taken on line 6—6 of FIG. 2 through the wheel axle and mounting bracket sleeve; and FIG. 7 is a perspective view of the novel one-piece mounting bracket shown in its relaxed condition.

DESCRIPTION OF A PREFERRED EMBODIMENT

Referring now specifically to the drawings, one form of device in which the present invention finds particular use, a trimmer-edger generally indicated at 10, is seen to include a motor and cutter head 12 including a motor housing 14 enclosing, for example, an electric motor drivingly connected to a rotary cutter blade disposed in a cutter housing 15. The motor housing 14 has an axial extension 17 journaled on and receiving a lower horizontal end 16 of a tubular handle 19, the upper end of which incorporates a suitable hand grip and control switch for the device. The housing extension 17 includes a control clamp operated by a manually-releasable wing nut whereby the motor and cutter head 12 can be turned through substantially 90° and re-secured to handle 19 when it is desired to use the tool as a trimmer. The details of this securing means for the motor and cutter head 12 are not illustrated nor described in detail here since they form no part of this invention. However, for a better understanding thereof, reference may be made to the Ehrlich copending application Ser. No. 309,977, filed Nov. 28, 1972, and owned by the Assignee hereof.

The trimmer-edger 10 is supported for movement over the ground by a pair of wheels 28, 30 secured to the lower handle end 16 by a novel clamp bracket assembly generally indicated at 22. As shown in FIGS. 2-4 and 7, this assembly includes a one-piece bracket 24 having an arcuate sleeve 32 and upper and lower clamp plates 40, 48, respectively. The sleeve 32 is adapted to telescope over the lower handle end 16 and is generally complementary thereto, while the clamp plates 40, 48 extend to one side of the handle end 16. Note that a portion of lower clamp plate 48 embraces the bottom of handle end 16.

The wheels 28, 30 are secured at opposite ends of an axle 28 extending between clamp plates 40, 48, and are secured thereby to the handle end 16. As shown, the bracket 24 is apertured at 56 to receive the axle 28, and its clamp plates 40, 48 are grooved along their entire length as shown at 42, 54, respectively, to receive and securely clamp the axle 28 therein. Importantly, the lower handle end 16 has a transverse groove 20 formed therein which receives the upper portion of the axle 28 between the groove 42 and aperture 56 (FIGS. 3 and 6) to stabilize and rigidify the connection of the axle 28 to handle end 16.

To facilitate assembly and disassembly of the bracket 24 to the axle 28 and the lower handle end 16, the clamp plates 40, 48 are normally biased apart, as shown in FIG. 7. This allows the arcuate portion 32 of bracket 24 to be telescoped over the handle end 16. With the grooves 54, 20 aligned, the axle 28 is inserted in place and the clamp plates 40, 48 drawn together by means of bolts 52, extending through openings 44, 50, and nuts 53. This secures the bracket 24 to handle end 16 and to the axle 28. Thereafter, wheels 28, 30 are suitably secured to axle 28.

An additional feature of this invention resides in the inherent axial disposition of the wheel 30 relative to the handle 19. It will be appreciated that when the motor and cutter head 12 is disposed as shown in FIG. 1, a substantial amount of weight is disposed laterally of the handle end 16. The outboard location of wheel 30 readily accommodates this condition and affords good balance and control of the tool 10.

The transverse groove 20 in the handle portion 16 together with the plates 40, 50 which are rigidified by their respective grooves 42, 54 receiving the axle 26 therein, provide an unusually rigid and inexpensive, and remarkably stable mounting for the axle and wheels of the tool.

By the foregoing there has been disclosed an improved wheel mounting assembly calculated to fulfill the inventive objects set forth herein, and while a preferred embodiment of the invention has been illus-

What is claimed is:

1. An axle assembly comprising a one-piece bracket including a sleeve portion for conforming, in part, to a handle extending therethrough, a first clamping plate extending laterally from one side portion of said sleeve portion, and a second clamping plate extending laterally from said sleeve portion from a side portion opposite that portion from which said first clamping plate extends, said second clamping plate extending in spaced relation from the sleeve portion and continuing into substantially coextensive relation to said first clamping plate, said clamping plates including portions for combining to grip an axle juxtaposed therebetween, and an aperture portion in said sleeve portion at the juncture with the second clamping plate for permitting the axle to project therethrough.

2. The mounting bracket as claimed in claim 1 in which said plates include overlying grooved portions for rigidifying, conforming, and engaging longitudinally of intermediate portions of an axle element, the grooved portion of said clamping plate communicating with said aperture.

3. The structure as claimed in claim 1 in which said clamping and mounting plates include means for receiving fastening means for securing the plates in clamped relationships on the axle element.

4. In an operator-guided vehicular tool comprising an elongated handle, an assembly comprising, in combination, a one-piece mounting bracket including a sleeve portion circumposed about an intermediate portion of the handle, said bracket including a first clamping plate extending laterally from said sleeve portion at one side thereof, a second clamping plate extending from the sleeve portion from a side portion opposite that from which said first clamping plate extends and continuing in juxtaposed relationship to said first clamping plate transversely of said handle; an axle clamped between said clamping plates and including terminal portions projecting beyond said plates and sleeve for receiving wheels journaled thereon.

5. The structure as claimed in claim 4 including a multi-positionable cutting tool journaled on said handle, said tool having a position in which a substantial portion of the weight thereof is disposed in offset relation to the handle on which said tool is journaled, said clamping plates being offset from said handle in the same direction toward which the substantial portion of the tool weight is disposed for providing an "outrigger" type support stabilizing the tool as it is propelled and operated.

6. The structure as claimed in claim 4 in which said plates include confronting grooved portions engaging opposite intermediate portions of said axle element disposed therein, said second clamp plate grooved portion extending transversely of said handle, the sleeve portion including an aperture communicating with the first clamp plate groove and through which said axle element projects.

7. The tructure as claimed in claim 6 in which said handle includes a transverse groove opposite the grooved portion in said second clamping plate and receiving an intermediate portion of said axle element therein.

8. The structure as claimed in claim 4 including removable fastener means engaged between said plates for retaining said mounting bracket, handle, and axle element in assembled relation.

9. The structure as claimed in claim 4 in which said handle and sleeve include substantially complementary, longitudinally arcuate portions generally transverse of said axle element.

10. The structure as claimed in claim 4 in which said clamping plates are disposed at lower marginal side wall portions of said sleeve portion and are disposed beneath the handle.

* * * * *